US012576654B2

(12) United States Patent
Knoblauch et al.

(10) Patent No.: US 12,576,654 B2
(45) Date of Patent: Mar. 17, 2026

(54) FOOD PRODUCT SCALE AND ASSOCIATED LABEL STOCK JUSTIFICATION ASSEMBLY

(71) Applicant: ILLINOIS TOOL WORKS INC., Glenview, IL (US)

(72) Inventors: Austin Knoblauch, Centerville, OH (US); Randall L. Redman, Beavercreek, OH (US); Robert Andrew Holmes, Worcester (GB); Ian D. Taylor, Warwickshire (GB)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 18/756,834

(22) Filed: Jun. 27, 2024

(65) Prior Publication Data

US 2026/0001361 A1     Jan. 1, 2026

(51) Int. Cl.
*B41J 15/04*          (2006.01)
*B41J 3/407*         (2006.01)
*G01G 19/40*         (2006.01)
*G01G 19/52*         (2006.01)

(52) U.S. Cl.
CPC .......... *B41J 15/044* (2013.01); *B41J 3/4075* (2013.01); *G01G 19/40* (2013.01); *G01G 19/52* (2013.01)

(58) Field of Classification Search
CPC ...... B41J 3/4075; B41J 11/0075; B41J 11/46; B41J 15/044; G07F 17/42; G01G 19/40; G01G 19/52; G01G 19/4144
See application file for complete search history.

(56) References Cited

U.S. PATENT DOCUMENTS

| | | | | | |
|---|---|---|---|---|---|
| 6,164,203 | A | * | 12/2000 | Keller | ................. B65C 11/0289 242/597.5 |
| 8,517,618 | B2 | * | 8/2013 | Cartwright | ............... B41J 11/46 400/613 |
| 2010/0111586 | A1 | * | 5/2010 | Kawabe | ................. B41J 15/042 400/613 |
| 2010/0202817 | A1 | * | 8/2010 | Shishido | ................ B41J 15/042 242/558 |

FOREIGN PATENT DOCUMENTS

| | | | | | |
|---|---|---|---|---|---|
| CN | 201193958 | Y | * | 2/2009 | |
| CN | 112810325 | A | | 5/2021 | |
| EP | 1066972 | A2 | * | 1/2001 | .............. B41J 15/04 |
| EP | 1559564 | A2 | * | 8/2005 | ......... B41J 11/0025 |
| EP | 4186707 | A1 | | 5/2023 | |
| JP | 2009014455 | A | * | 1/2009 | |

* cited by examiner

*Primary Examiner* — Christopher E Mahoney
*Assistant Examiner* — Marissa Ferguson-Samreth
(74) *Attorney, Agent, or Firm* — THOMPSON HINE LLP

(57) ABSTRACT

A printer includes a printer body including a cassette station, and a media cassette including a media supply hub for holding media supply roll, wherein the media cassette is engageable in a loaded position in the cassette station and is removable from the cassette station for the purpose of media replacement. The cassette station includes a media supply justification arm positioned for engaging with a side edge of the media supply roll when the media cassette is engaged in the loaded position.

19 Claims, 6 Drawing Sheets

FOOD PRODUCT SCALE AND ASSOCIATED LABEL STOCK JUSTIFICATION ASSEMBLY

TECHNICAL FIELD

This application relates generally to scales used for weighing food product in supermarkets, groceries and other stores, and, more particularly, to a scale including a label stock justification.

BACKGROUND

In typical commercial food product scale applications the scale is used to weigh food products and determines prices for the food products, and an associated printer prints a label for application to the food product. An operator enters a product number, such as a PLU (price look-up) number, for the product being weighed and the scale accesses its database, or accesses a remote database, for pricing information on the product. The total price for the item is then determined based upon its weight. Price can also be determined based upon item count. In either case, the food product scale typically prints a label with the price and other information for the product.

Different label sizes can be used in the food product scale, which in some cases results in the need to accommodate different label stock widths. Similarly, other devices, such as printers, can accommodate different widths of label stock or other media. As used herein, the term printer encompasses both devices that function solely or primarily as printers, as well as other devices that include a printer function but also include other functions in addition to printing, such as a weighing scale that also prints labels. Such scales and other printers can include label stock or other media cassettes that are removable for the purpose of replacing or changing the label stock or other media loaded into the cassette. Label cassettes used in prior printers have included a label stock justification arm that was carried on the cassette and required manual adjustment for different label stock widths and potential for improper end user use. For example, the arm would need to be folded up out of the way to replace the label stock roll, and many end users would forget to fold the arm back down into its operating position, leading to tracking issues while printing. The arm also snapped onto the cassette body moulding and had a tendency to fall off and become easily lost by the end user.

It would be desirable to provide a scale (or other printer) with a more user-friendly label stock (or other media) roll justification arm arrangement.

SUMMARY

In one aspect, a printer includes a printer body including a cassette station, and a media cassette including a media supply hub for holding media supply roll, wherein the media cassette is engageable in a loaded position in the cassette station and is removable from the cassette station for the purpose of media replacement. The cassette station includes a media supply justification arm positioned for engaging with a side edge of the media supply roll when the media cassette is engaged in the loaded position.

In another aspect, a printer includes a printer body including a cassette station. A media supply justification arm is mounted to the printer body and positioned for engaging with a side edge of a media supply roll when a media cassette is engaged into a loaded position in the cassette station. The media supply justification arm is mounted for movement on the printer body.

The details of one or more embodiments are set forth in the accompanying drawings and the description below. Other features, objects, and advantages will be apparent from the description and drawings, and from the claims.

DETAILED DESCRIPTION

Figure 1:
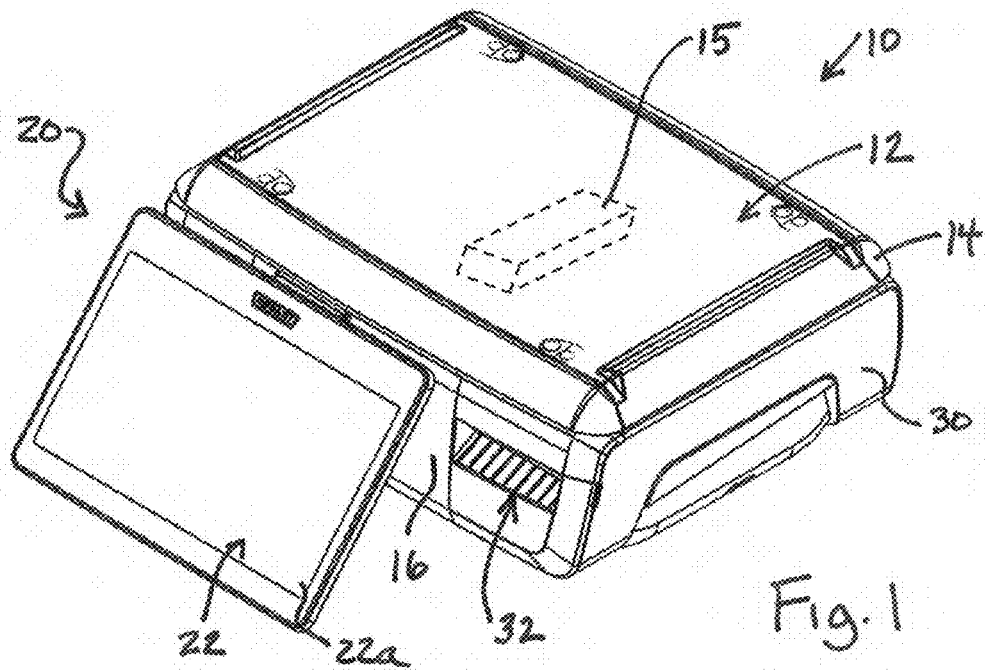
FIGS. 1 and 2 show perspective views of a scale.
Figure 2:
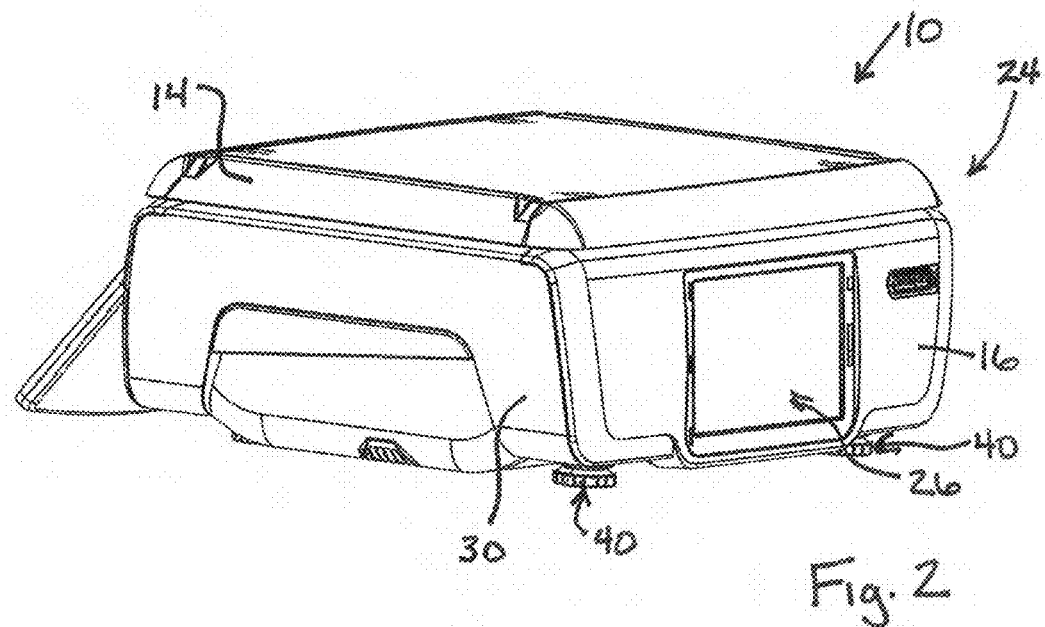
Figures 3, 4:
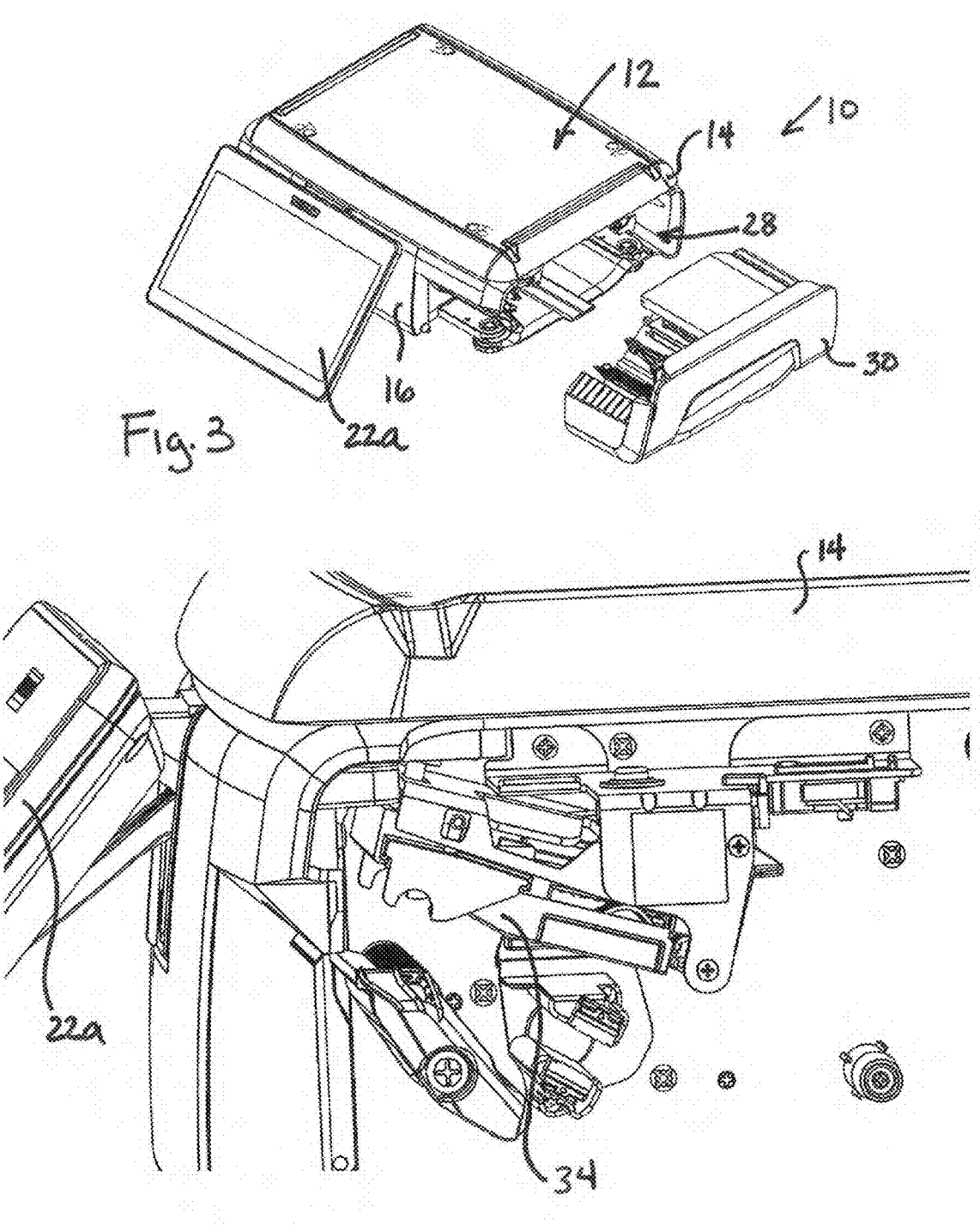
FIG. 3 shows a perspective view with label cassette removed.
FIG. 4 shows a partial perspective of a printhead region within the cassette receiving station.

Referring to FIGS. 1-11, an exemplary scale configuration is shown. The scale 10 includes a weighing station 12, which in some embodiments may be formed by a weighing platter 14 that can be removed (e.g., for cleaning) from atop the scale body 16. A platter support bracket (not shown) transfers forces to a mechanism, such as a load cell 15 located internal of the scale body 16, for producing weight indicative signals when items are placed on the weighing station. An operator interface side 20 of the scale includes an operator interface 22 configured to display information associated with scale operations. By way of example, the operator interface 22 may be formed by a touch-screen display 22a. A customer interface side 24 of the scale includes a customer interface 26, which in certain embodiments may be formed by any suitable display screen technology.

Figure 5:
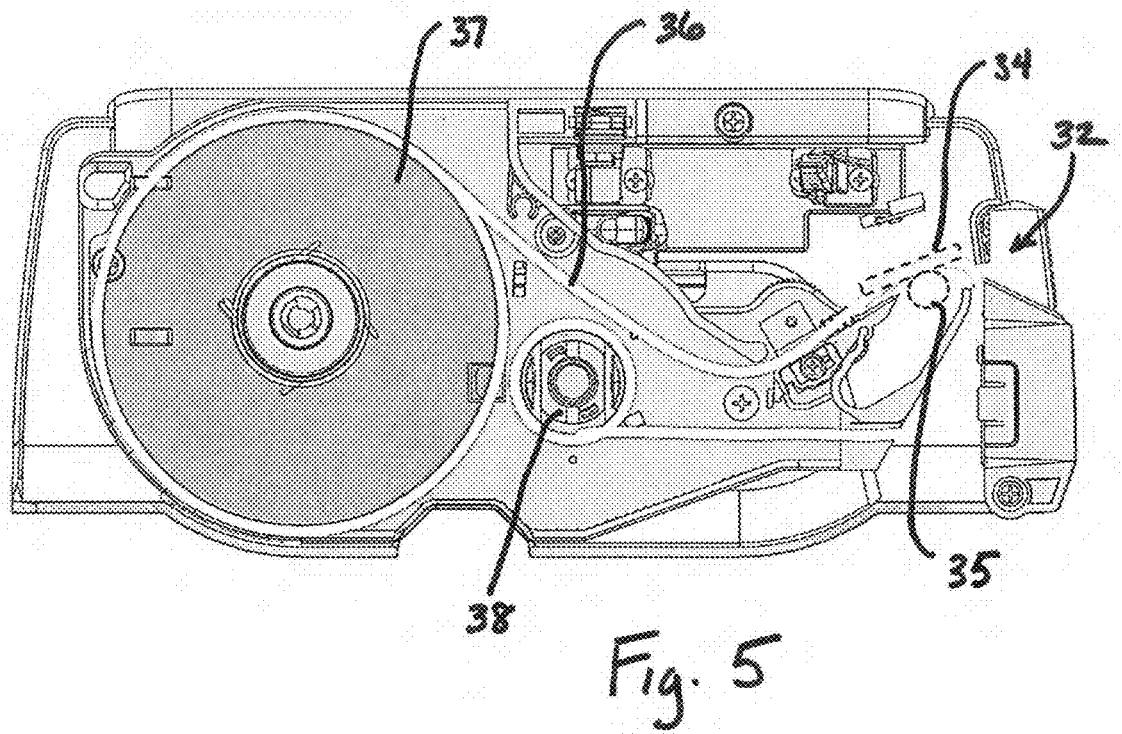
FIG. 5 shows a side elevation cross-section showing a label stock path.
Figures 6, 7:
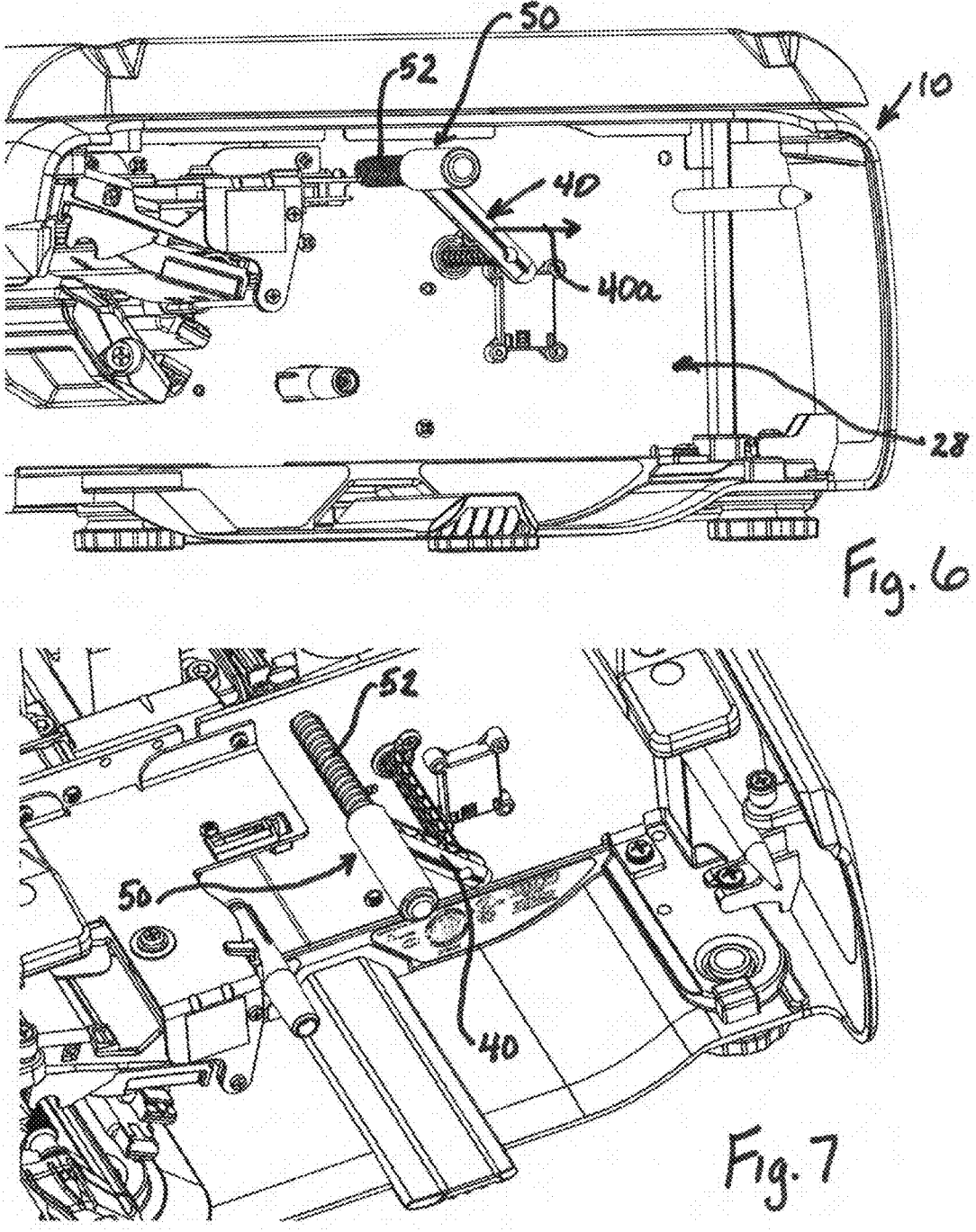
FIGS. 6-8 show perspective views of the cassette or portions thereof.
Figure 8:
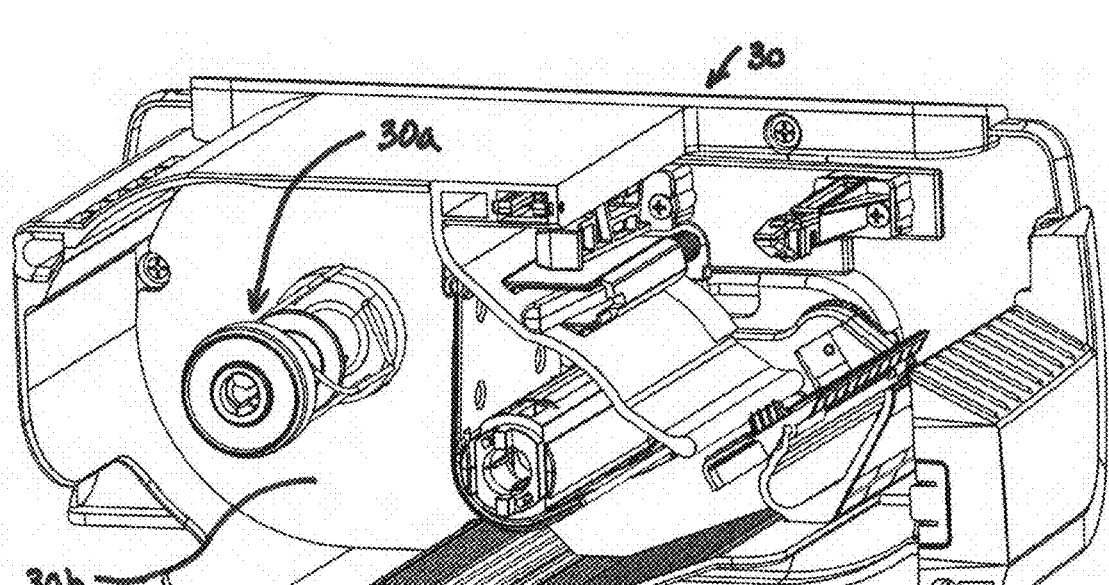
Figure 9:
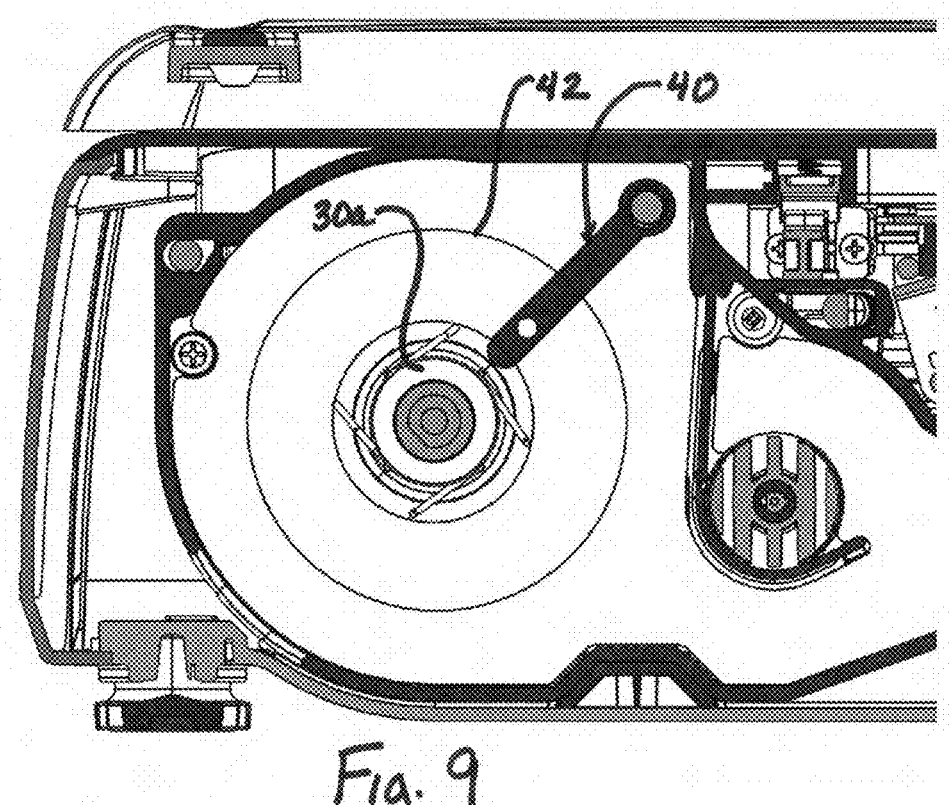
FIG. 9 shows a cross section through the cassette when loaded into the cassette station.
Figures 10, 11:
FIGS. 10-11 show perspective section views of the justification arm arrangement of the cassette station.

A side portion of the scale body incudes a cassette station 28 that receives a removable label stock cassette 30 that defines a label exit slot 32. A label printer (e.g., a printhead 34 and associated print roller 35) is located within the scale body and may use any suitable printing technology for printing on labels of a label supply roll 37 loaded in the cassette 30, which printed labels then exit the label exit slot 32 to be applied to products. FIG. 5 shows, along a view looking inward into the cassette station, a label stock path 36 for label stock that includes a liner that is taken up on a take-up reel 38, but linerless label stock could also be used. By way of example, the printhead 34 may be a thermal printhead for printing on thermal label stock.

The cassette station includes a label stock supply justification arm 40 positioned for engaging with an inwardly facing side edge of the label stock supply roll 42 when the label stock cassette 30 is engaged in the loaded position. The label stock supply roll 42 is located on a label stock support arm 30a of the cassette. The label stock supply justification arm 40 remains in the cassette station 28 when the cassette is removed from the cassette station. The label stock supply justification arm 40 is biased in a direction 40a outward from the cassette station 28 and is movable in an opposite direction when contacted by the label stock supply roll 42 as the cassette 30 is moved into the loaded position. The label stock justification arm therefor applies a continuous pressure against the label stock roll to hold the roll and label stock in a position on the support arm 30a seated against an inward facing surface portion 30b of the cassette 30.

Here, the label stock supply roll justification arm 40 is carried by a mount part 50 that is engaged by a spring 52 to bias the arm in the direction outward from the cassette station. The spring 52 is disposed on a shaft 54, and the mount part 50 comprises a mount collar 50a disposed for movement along the shaft 54. The label stock supply roll justification arm 40 is further carried by a stabilizing part 56 that is movable with the label stock supply roll justification arm 40. Here, the stabilizing part comprises a shaft 56a that is mounted for movement through a guide bushing 58. The label stock supply roll justification arm 40 extends from the mount part 50 to the stabilizing part 56. In one embodiment, the label stock supply roll justification arm 40, the mount part 50 and the stabilizing part 56 are formed as a monolithic molded component.

Here, an axis 50b of the mount part 50 runs parallel to the direction 40a, an axis 56b of the stabilizing part 56 runs parallel to the direction 40a, and an axis 40b of the label stock supply roll justification arm 40 runs transverse to the direction 40a.

The described system provides an arrangement that allows the arm 40 to slide back and forth along the depth of the shaft 54. The arm 40 is under the load of the compression spring 52, which forces the arm to the outer end of its stroke and is mounted to the scale body. In implementations, the arrangement is capable of supporting label medias with a width between 38 mm and 80 mm. As the cassette with label media is loaded into the cassette station, the side of the label media roll will come into contact with the side of the arm. As the cassette is pushed into the cassette station, the arm will compress the spring and move inwardly of the cassette station as needed to always apply a minimal amount of force to the edge of the label media roll to prevent the label media from tracking poorly. As the label media runs out, the end of the arm 40 will always be touching the media's core to prevent the arm 40 from springing to the unloaded position and crushing the label media. When the cassette is removed, the arm will slide back out to the unloaded position and remain there until the cassette is inserted again.

This system allows for simplicity of installing a roll of label media by removing the need to rotate and adjust an arm on the cassette to align the edge of the roll. The design offers a passive arm that will move with the edge of the roll and adapt to the various widths with no end user intervention. The design is also very helpful for the case where an end user slams the cassette into the cassette station. Under this aggressive loading condition, the liner of a die-cut media roll has the tendency to telescope, which leads to very poor liner tracking and ultimately causes a label jam. The outwardly biased and movable justification arm prevents such telescoping.

It is to be clearly understood that the above description is intended by way of illustration and example only, is not intended to be taken by way of limitation, and that other changes and modifications are possible. For example, while the above-described embodiment if focused on a printer in the form of a scale, the system could be implemented on printers that do not include scale functionality. Moreover, the system could be employed in connection with printers that print on media other than label stock.

Still other variations are possible.

The invention claimed is:
1. A printer, comprising:
a printer body including a cassette station;

a media cassette including a media supply hub for holding a media supply roll, wherein the media cassette is engageable in a loaded position in the cassette station and is removable from the cassette station for the purpose of media replacement;
wherein the cassette station includes a media supply justification arm positioned for engaging with a side edge of the media supply roll when the media cassette is engaged in the loaded position;
wherein the media supply justification arm is biased in a first axial direction outward from the cassette station and is movable in a second axial direction, opposite the first axial direction, when contacted by the media supply roll as the media cassette is moved into the loaded position.

2. The printer of claim 1, wherein the media supply justification arm remains in the cassette station when the media cassette is removed from the cassette station.

3. The printer of claim 1, wherein media supply roll justification arm is carried by a mount part that is engaged by a spring to bias the media supply roll justification arm in the first axial direction.

4. The printer of claim 3, wherein the spring is disposed on a shaft, and the mount part comprises a mount collar disposed for movement along an axis the shaft.

5. The printer of claim 3, wherein the media supply roll justification arm is further carried by a stabilizing part that is movable with the media supply roll justification arm.

6. The printer of claim 5, wherein the stabilizing part comprises a shaft that is mounted for axial movement through a guide bushing.

7. The printer of claim 1, wherein media supply roll justification arm extends from a mount part to a stabilizing part.

8. The printer of claim 7, wherein the media supply roll justification arm, the mount part and the stabilizing part are formed as a monolithic molded component.

9. The printer of claim 7, wherein the mount part is a mount collar that rides axially along a shaft, wherein the stabilizing part is a movable shaft that is supported for axial movement through a bearing.

10. The printer of claim 7, wherein an axis of the mount part runs parallel to the first axial direction, an axis of the stabilizing part runs parallel to the first axial direction, and an axis of media supply roll justification arm runs transverse to the first axial direction.

11. The printer of claim 1, wherein the printer takes the form of a scale that also includes a weigh station for receiving items to be weighed and a load cell for outputting a weight indicative signal.

12. A printer, comprising:
a printer body including a cassette station having an open cassette receiving side; and
a media supply justification arm mounted to the printer body and positioned for engaging with a side edge of a media supply roll when a media cassette is engaged into a loaded position in the cassette station, wherein the media supply justification arm is mounted for movement on the printer body in an outward direction toward the open cassette receiving side and an inward direction away from the open cassette receiving side, wherein the media supply justification arm is mounted such that a bias is applied to urge the media supply justification arm in the outward direction and movement of the media supply justification arm in the inward direction will occur when a force sufficient overcome the bias is applied to the media supply justification arm.

13. The printer of claim 12, wherein media supply roll justification arm is carried by a mount part that is engaged by a spring to bias the media supply roll justification arm in the outward direction.

14. The printer of claim 13, wherein the spring is disposed on a shaft, and the mount part comprises a mount collar disposed for movement along the shaft.

15. The printer of claim 14, wherein the media supply roll justification arm is further carried by a stabilizing part that is movable with the media supply roll justification arm.

16. The printer of claim 15, wherein the stabilizing part comprises a shaft that is mounted for movement through a guide bushing.

17. The printer of claim 16, wherein media supply roll justification arm extends from the mount part to the stabilizing part.

18. A printer, comprising:
a printer body including a cassette station;

a media cassette including a media supply hub for holding media supply roll, wherein the media cassette is engageable in a loaded position in the cassette station and is removable from the cassette station for the purpose of media replacement;

wherein the cassette station includes a media supply justification arm positioned for engaging with a side edge of the media supply roll when the media cassette is engaged in the loaded position;

wherein media supply roll justification arm extends from a mount part to a stabilizing part;

wherein the mount part is a mount collar that rides along a shaft, wherein the stabilizing part is a movable shaft that is supported for movement through a bearing.

19. The printer of claim 18, wherein the media supply justification arm is biased in a first direction outward from the cassette station and is movable in a second direction, opposite the first direction, when contacted by the media supply roll as the media cassette is moved into the loaded position.

* * * * *